G. L. DZWONKOWSKI.
REVERSE VALVE ARRANGEMENT.
APPLICATION FILED AUG. 6, 1909.

1,002,047.

Patented Aug. 29, 1911.

2 SHEETS—SHEET 1.

Witnesses

Inventor
George L. Dzwonkowski.

By

Attorneys

G. L. DZWONKOWSKI.
REVERSE VALVE ARRANGEMENT.
APPLICATION FILED AUG. 6, 1909.
1,002,047.
Patented Aug. 29, 1911.
2 SHEETS—SHEET 2.
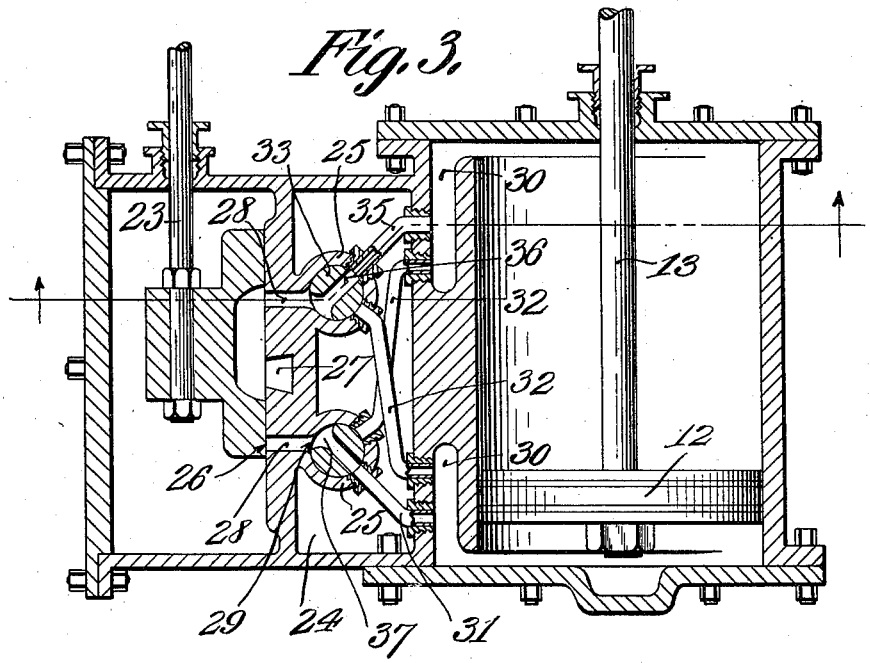
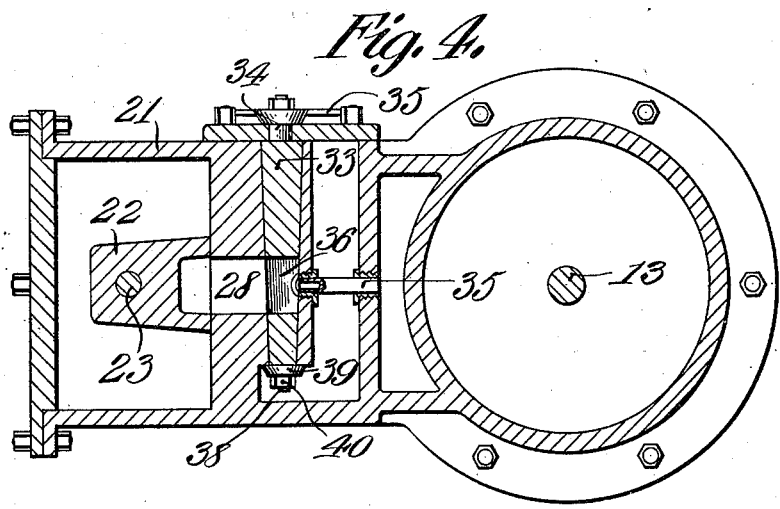
Witnesses
John C. Firmin.
L. N. Gillis
Inventor
George L. Dzwonkowski.
By Chandlee & Chandlee
Attorneys

UNITED STATES PATENT OFFICE.

GEORGE L. DZWONKOWSKI, OF ALMOND, WISCONSIN.

REVERSE-VALVE ARRANGEMENT.

1,002,047.

Specification of Letters Patent. Patented Aug. 29, 1911.

Application filed August 6, 1909. Serial No. 511,545.

*To all whom it may concern:*

Be it known that I, GEORGE L. DZWONKOWSKI, a citizen of the United States, residing at Almond, in the county of Portage, State of Wisconsin, have invented certain new and useful Improvements in Reverse-Valve Arrangements; and I do hereby declare the following to be a full, clear, and exact description of the invention, such as will enable others skilled in the art to which it appertains to make and use the same.

This invention relates to steam engines and has special reference to a form of reverse valve therefor.

One object of the invention is to provide a novel form of reverse valve for a slide valve engine, the valve being located between the steam chest proper and the cylinder.

Another object of the invention is to simplify the operating mechanism for valves of this description.

With the above and other objects in view, as will be hereinafter apparent, the invention consists in general of an auxiliary steam chest situated between the main steam chest and the cylinder, together with an improved form of valve held in said chest and novel actuating means therefor.

The invention further consists in certain novel details of construction and combinations of parts hereinafter fully described, illustrated in the accompanying drawings, and specifically set forth in the claim.

Figure 1:
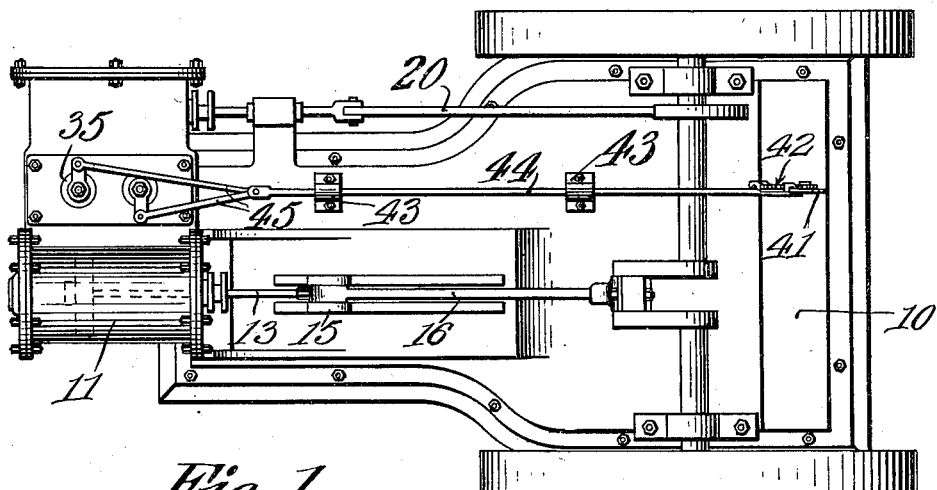
Figure 2:
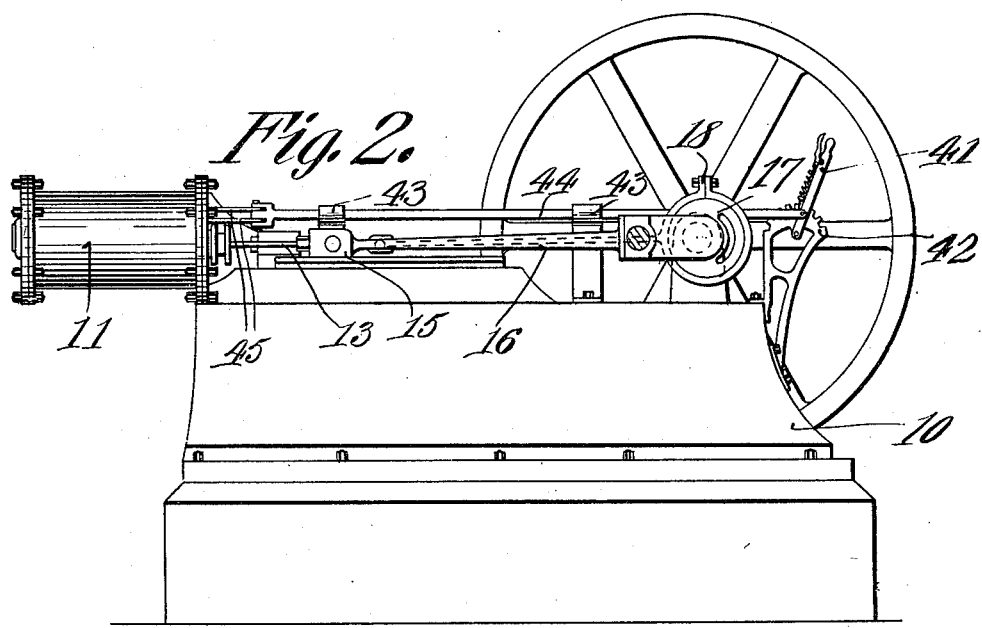

In the accompanying drawings, like characters of reference indicate like parts in the several views, and:—Figure 1 is a top plan view of an engine equipped with this invention. Fig. 2 is a side elevation thereof. Fig. 3 is a horizontal section taken through the steam chest and cylinder. Fig. 4 is a transverse section therethrough.

The numeral 10 indicates the bed of an engine and mounted on this bed is the usual cylinder 11 wherein moves a piston 12 having a piston rod 13 connected thereto. Rotatably mounted in suitable bearings on the cylinder bed is a crank shaft 14 and this crank shaft is connected in the usual manner to a cross head 15 on the piston rod 13 by means of a connecting rod 16. Upon the shaft 14 is mounted an eccentric 17 provided with the usual straps 18 and rod 20.

The engine is equipped with a casing 21 which is divided by a partition wall 21ᵃ into two compartments, namely, a steam chest 21ᵇ and a valve chamber 21ᶜ. In the steam chest is arranged a valve 22 which slides over the said wall 21ᵃ, and is provided with a valve stem 23 which is in turn connected to the eccentric rod 20. Formed integral with the wall 21ᵃ, and disposed in the chamber 21ᶜ, are spaced valve seats 25, and communicating therewith and with the steam chest are ports 28 which are formed in said partition, said ports being enlarged adjacent the valve seat as indicated at 29. Formed in the steam chest side of the partition wall, and intermediate the said inlet ports, is an exhaust port 27.

The cylinder 11 is provided with ports 30 and from these ports lead passages 31 which extend to the valve seats 25, one of the passages leading to one valve seat and the other to the other valve seat. From these ports also extend passages 32 which lead to the valve seats 25, but these passages cross each other so that they lead to different valve seats from the passages 31 respectively.

Held in the valve seats 25 are frusto-conical valves 33 each of which is provided with a stem 34 whereon is mounted a rock arm 35, and these valves have formed therethrough a steam passage 36 having an enlarged mouth 37. These valves further have a reduced end as indicated at 38 and on this end is carried a washer 39 and a nut 40 for the purpose of holding the valves securely in the valve seats.

Mounted on the engine bed is a latch lever 41 which travels over a quadrant 42, the latch of the latch lever engaging with the teeth on the quadrant. Mounted in suitable guides 43 is a reach rod 44 whereto is connected a pair of links 45, one of these links being connected to one of the arms 35 and the other to the arm 35 of the other valve.

In the operation of the device the eccentric is fixed on the shaft so that it cannot be moved and no reverse links are interposed between the valve stem and eccentric, but the valves 33 act to reverse the engine in the following manner. With the valves positioned as shown in the horizontal section the steam will enter by means of the rear port 30 and exhaust by means of the front port 30, while if the valves be rotated so that the passages 36 are brought into alinement with the passages 32 the steam will enter by the front port 30 and exhaust through the rear port 30. The motion of the engine can thus be reversed simply by changing the direction of the passages 36 in the valves 33 so that they connect their respective passages 28 with either the passages 31 or the passages 32.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claim.

Having thus described the invention, what is claimed as new, is:—

In an engine, a cylinder provided with spaced ports, a casing associated with said cylinder and provided with a partition wall to form a steam chest and a valve chamber, spaced valve seats disposed within said chamber and formed integral with said wall, said wall being provided with ports communicating with the steam chest and the valve seats, connections between each valve seat and each end of the cylinder, valves respectively mounted in said valve seats for controlling the flow of steam through said ports and connections, rotary valves disposed within said valve seats for controlling the passage of steam therethrough, means for simultaneously actuating said valves, a valve slidably mounted upon the partition wall and within the steam chest and provided with an opening in its engaging face adapted to alternately cover and uncover the said ports, and means for actuating the last mentioned valve.

In testimony whereof, I affix my signature, in presence of two witnesses.

GEORGE L. DZWONKOWSKI.

Witnesses:
 H. A. MILLER,
 AUGUST DZWONKOWSKI.

Copies of this patent may be obtained for five cents each, by addressing the "Commissioner of Patents, Washington, D. C."